(12) United States Patent
Nysveen et al.

(10) Patent No.: US 6,364,677 B1
(45) Date of Patent: Apr. 2, 2002

(54) ARRANGEMENT IN TERMINATING A CABLE

(75) Inventors: Arne Nysveen, Borgen; Svend Roche, Drammen, both of (NO); Felix Greuter, Rutihof (CH); Elias Julke, Wettingen (CH); Jakob Rhyner, Zurich (CH)

(73) Assignee: ABB Research Ltd., Billingstad (NO)

(*) Notice: Subject to any disclaimer, the term of this patent is extended or adjusted under 35 U.S.C. 154(b) by 0 days.

(21) Appl. No.: 09/555,563

(22) PCT Filed: Dec. 16, 1998

(86) PCT No.: PCT/NO98/00382

§ 371 Date: Aug. 21, 2000

§ 102(e) Date: Aug. 21, 2000

(87) PCT Pub. No.: WO99/34495

PCT Pub. Date: Jul. 8, 1999

(30) Foreign Application Priority Data

Dec. 18, 1997 (NO) .......................................... 19975959

(51) Int. Cl.⁷ .............................. H01R 4/60; H01R 4/64
(52) U.S. Cl. ...................................... 439/199; 439/201
(58) Field of Search .................................. 439/199, 201

(56) References Cited

U.S. PATENT DOCUMENTS

| | | | |
|---|---|---|---|
| 3,324,449 A | * 6/1967 | McLoad | |
| 4,174,875 A | 11/1979 | Wilson et al. | ................. 339/91 |
| 4,689,440 A | 8/1987 | Morin | .......................... 174/19 |
| 5,171,158 A | * 12/1992 | Cairns | ........................ 439/199 |
| 5,577,926 A | 11/1996 | Cox | ............................ 439/204 |
| 5,645,442 A | * 7/1997 | Cairns | ......................... 439/201 |
| 5,722,842 A | * 3/1998 | Cairns | ......................... 439/139 |
| 5,738,535 A | * 4/1998 | Cairns | ......................... 439/138 |
| 5,772,457 A | * 6/1998 | Cairns | ......................... 439/201 |
| 5,838,857 A | * 11/1998 | Niekrasz | ....................... 385/56 |
| 6,017,227 A | * 1/2000 | Carins et al. | ................ 439/138 |

FOREIGN PATENT DOCUMENTS

| | | | |
|---|---|---|---|
| GB | 2124038 | 2/1984 | .......... H02G/15/14 |
| GB | 2140226 | 11/1984 | .......... H02G/15/06 |

* cited by examiner

Primary Examiner—Paula Bradley
Assistant Examiner—Edwin A. León
(74) Attorney, Agent, or Firm—Volpe and Koenig, P.C.

(57) ABSTRACT

The present invention relates to a device for terminating cables (1), particularly for underwater termination of high voltage power cable and for conducting high voltage conductors in an electrical underwater apparatus, with the purpose of providing a liquid and water tight termination, at the same time as it provides pressure relief for vital components. According to this it is suggested that: each high voltage conductor (phase) (2a, 2b, 2c) is terminated in a separate, liquid filled and pressure compensated interior chamber (7a, 7b, 7c); conduction of the high voltage conductor from each interior chamber into attached electrical apparatus is carried out by means of a solid electrical conductor (10a, 10b, 10c), said conductor being fixed in an insulation material (11) which is liquid and gas tight, the solid electrical conductor and insulation material forming a gas and liquid tight barrier between the cable conductor and attached apparatus, and all interior chambers (7a, 7b, 7c) are adapted to a common, liquid filled and pressure compensated outer chamber (4).

13 Claims, 2 Drawing Sheets

ARRANGEMENT IN TERMINATING A CABLE

FIELD OF THE INVENTION

The present invention relates to a device for terminating cables, particularly underwater termination of high voltage power cables, more particularly a device for conducting high voltage conductors to an electric underwater apparatus.

PRIOR ART

In relation to the conduction of high voltage conductors for electric underwater equipment, e.g. underwater engines and underwater transformers, it is for several reasons very important that the conduction is as leak tight as possible. Further, it is important that the liquid containing housing, where the terminating operation is carried out, is pressure compensated as compared to the ambient sea pressure and further has a controlled dielectric environment.

SE 504 919 (Johansson/Asea Brown Boweri AB) shows a cable termination for the connection of a high voltage cable with a solid insulation material, to an insulated conductor. In order to provide a suitable distribution of the electric field, a surrounding field directing means, a so called stress cone, is provided by the cable. The conductors in the cable are electrically connected to a plug-shaped connector and the joined connection is kept axially fixed in an insulating portion and is held in electric connection to a sleeve-shaped connector. The two connectors are joined together to a union having good electrical contact and mechanic strength, at the same time as the joint is surrounded by the said stress cone in order to achieve sufficient insulation between conductor and ground.

However, SE 504 919 does not suggest a joint withstanding water pressures at large depths. Also, SE 504 919 does not show a termination house that is pressure compensated as compared to the pressure exerted at large sea depth.

OBJECT OF THE INVENTION

An object of the present invention is to indicate a device for terminating cables especially effective and applicable for underwater use, also at large sea depths, e.g. down to 2000 m.

A further object of the present invention is to indicate a device for terminating cables, which by underwater use provides sufficient sealing against penetration of sea water, and sufficient sealing against penetration of interior liquids and fluids.

Yet another object of the present invention is to indicate a device for termination of cables, where parts or contents of the termination housing is pressure compensated against the ambient sea pressure.

A further object is to allow a large differential pressure between the sea water and the joined component, particularly in the area of the penetrator.

BRIEF DESCRIPTION OF THE INVENTION

These objects are achieved by a device of the kind indicated in the introduction, characterized in the features indicated by the appended patent claims.

Further features and advantages of the present invention will be understood by means of the following description in relation to the appended drawings and patent claims.

DESCRIPTION OF EMBODIMENTS

Figure 1:
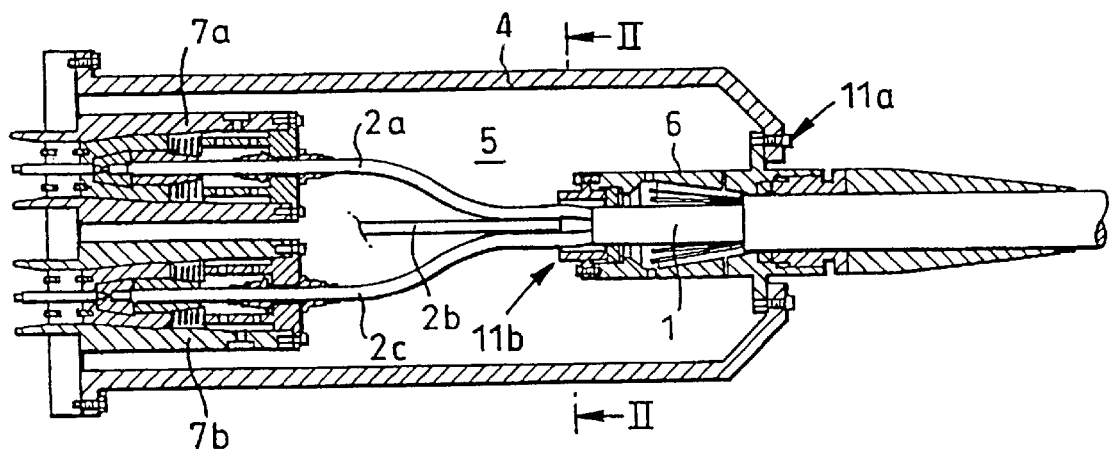
FIG. 1 is a sectional side view of an example of an embodiment for a device according to the invention.
Figure 2:
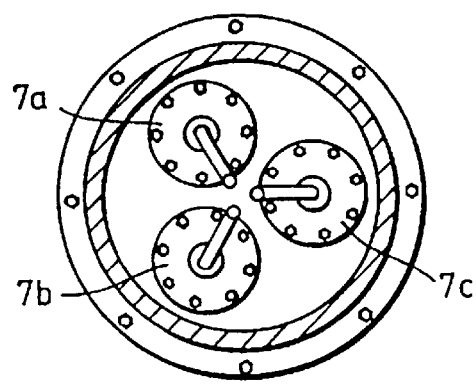
FIG. 2 is a sectional view along the line A—A in FIG. 1
Figure 3:
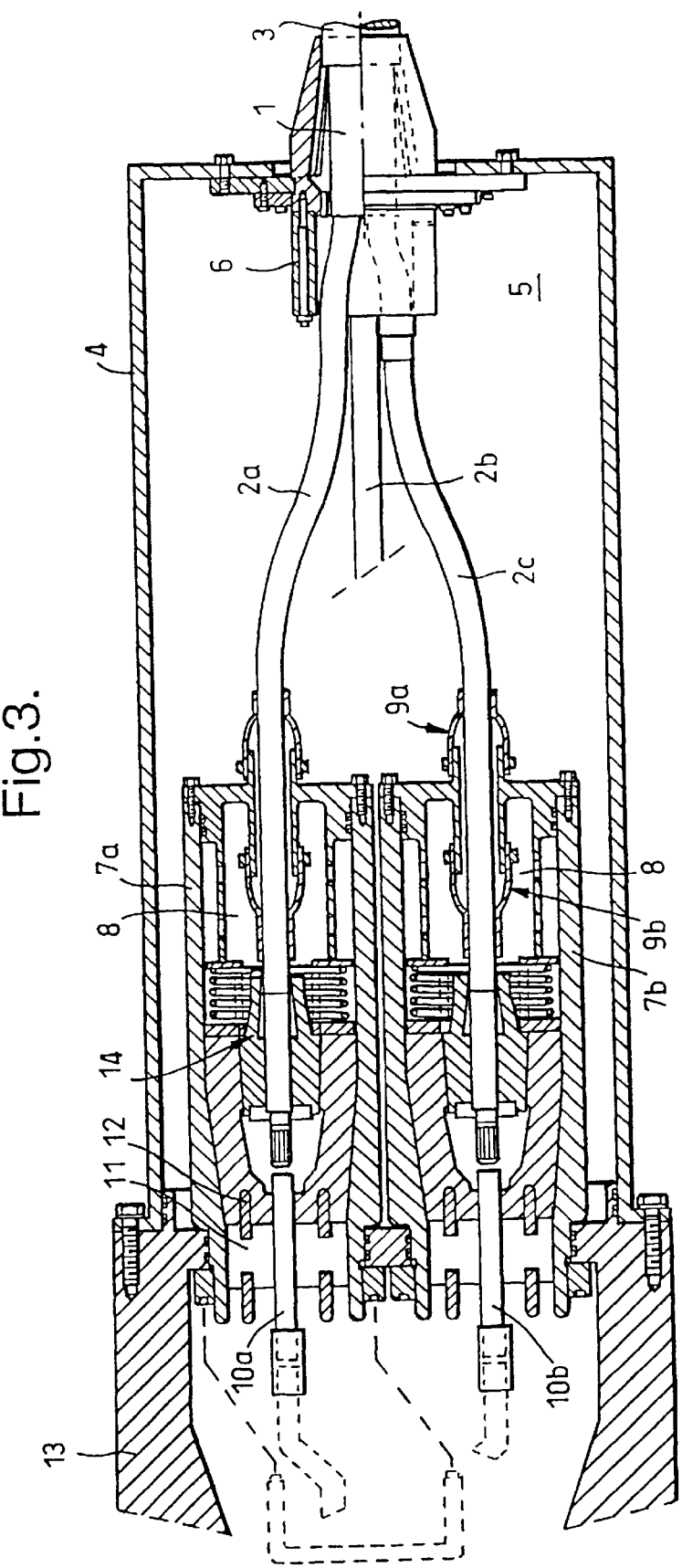
FIG. 3 shows, in larger scale, a section through a variant of the embodiment according to FIG. 1.

FIGS. 1 and 2 shows sectional side view and a sectional view, respectively, through an example of an embodiment for a device according to the invention, and in addition FIG. 3 shows a cable 1 comprising a number of insulated conductors, in this case the three conductors 2a, 2b and 2c, that are suitably insulated for high voltages, at the same time as the exterior of the cable 1 is provided with a common sheath 3, possibly also a reinforcement.

The embodiment of the cable 1, with the cable reinforcement and the exterior sheath 3, is according to FIGS. 1 and 2 terminated and fixed to a common outer metal terminating housing 4. The housing 4 is filled with a dielectric liquid 5, e.g. oil, and the single conductors 2a, 2b and 2c are sealed against the outer sheath 3 by means of a sealing device 6, in order to prevent the oil from leaking out into the surrounding water, or in order to prevent seawater from penetrating into the outer terminating housing 4. It can here be said that the metal housing 4, the seal 6 against the outer sheath 3 and the sealing between the single conductors provide a first barrier.

The single conductors 2a, 2b and 2c are beveled in the housing 4 in a manner preventing water, that has seeped into the cable and found its way between the phase conductors, from coming into the housing 4. Further, the sealing device 6 shall prevent the dielectric liquid 5 from entering the cable 1. Each conductor 2a, 2b and 2c is led into individual interior terminating housings 7a, 7b and 7c, respectively, at which the said high voltage insulation is terminated.

As shown most clearly in FIG. 3, each of the terminating housings 7a–7c is filled with dielectric liquid 8 which is pressure compensated against the pressure of the dielectric liquid 5 in the outer terminating housing 4. In order to prevent the liquid 5 from the outer housing 4 from penetrating into the interior terminating housing 7a–7c, or vice versa, a sealing device 9a, 9b is provided in the area where the single conductor 2a, 2b, 2c is led into its respective terminating housing 8.

The interior terminating housing 8 is surrounded by a common outer terminating housing 4, and solid metal conductors 10a, 10b, 10c are led through a suitable wall of a dielectric material, e.g. a glass wall 11, provided at the end opposite of the sealing device 6, in order to lead the flow to the components 13, onto which the outer terminating housing 4 is mounted. The wall 11 is made to withstand large differential pressure.

In order to prevent the dielectric liquid 8 in the interior housing 7a–7c from flowing into the area between the cable conductors, each single conductor is filled with a few meters of a suitable material that hardens after injection. A new process is developed for this purpose and the result will be that the cable conductor becomes leak tight for Helium. The insulation is terminated in such a manner that the electric field strength is controlled within certain maximal values (field control).

In other words the present invention indicates a device for underwater termination of a cable, especially a high voltage power cable for conducting high voltage conductors to an electrical underwater apparatus, where each high voltage conductor 2a–2c is terminated in a separate, liquid filled and pressure compensated chamber 7a, 7b respectively, also called interior chambers.

In addition, the conduction of a high voltage conductor from each interior chamber 7a–7c to an attached electrical apparatus 13 is carried out by means of a solid electric conductor 10a, 10b, 10c respectively, which is enclosed in a liquid and gas tight insulation material 11, thus letting the solid electrical conductors 10a–10c and the insulation material 11 provide a leak tight barrier between the cable conductors and the attached apparatus 13.

It is also understood that all of the interior chambers are enclosed in a common liquid filled and pressure compensated outer chamber 4.

Both the outer chamber 4 and the individual interior chambers 7a–7c contain a dielectric liquid 8, e.g. a suitable oil.

Between a phase conductor 2a, 2b and 2c and the surrounding water there is arranged a sealing device 6 comprising at least two sealing devices, an outer device 11a preventing penetration of seawater and an interior device 11b preventing contact between liquid in the outer chamber 4 and water between the phase conductors, at the same time as the two devices 11a and 11b are separated by a dielectric material.

Because each phase conductor 2a, 2b, 2c is filled with a sealing material, it will be prevented that the liquid leaks out into the phase conductor and possible water in the cable conductor penetrates into the respective interior chamber 7a, 7b, 7c.

In the terminating zone of the cable insulation, i.e. in each of the interior chambers 7a, 7b, 7c, a terminating area 14 is provided, whereby the electric field is controlled either geometrically or by resistive-refractive methods.

Moreover, the outer sheath 3 of the cable 1 is terminated in the outer chamber 4.

A liquid tight barrier 6 which prevents liquid flow in both directions is provided between the cable 1 and the outer chamber 4.

Particularly, as shown by the embodiment according to FIG. 3, a liquid tight barrier is provided between the outer chamber 4 and the cable 1, in order to prevent water in the cable 1 between the phase conductors 2a, 2b, 2c from penetrating into the outer chamber 4, and the liquid 5 in the outer chamber from penetrating into the cable 1 between the said phase conductors 2a, 2b, 2c. A liquid tight barrier is also provided between the outer sheath of the cable and the outer housing in order to prevent seawater from penetrating said housing.

If desirable, the liquid can be exchanged continuously or discontinuously, e.g. by means of suitably arranged organs.

As related to the pressure compensation, it can be separate for each chamber or common for all interior chambers. In addition to liquid, parts of said outer chamber and the described interior chambers can be partly filled with solid insulation material.

In a suitable embodiment, each of the solid electrical conductors 10a, 10b, 10c are led into the attached apparatus 13 through the glass wall, the creeping current distance between the respective phase conductor and ground (the chamber) being such that said distance is increased, e.g. as shown in FIG. 3, where the insulation material is arranged as one or more rings 12 of ceramic or corresponding material.

What is claimed is:

1. Device for terminating cables (1), particularly for underwater termination of high voltage power cable and for conducting high voltage conductors in an electrical underwater apparatus, characterized in that each high voltage conductor (phase) (2a, 2b, 2c) is terminated in a separate, liquid filled and pressure compensated interior chamber (7a, 7b, 7c), conduction of the high voltage conductor from each interior chamber into attached electrical apparatus is carried out by means of a solid electrical conductor (10a, 10b, 10c), said conductor being fixed in an insulation material (11) which is liquid and gas tight, the solid electrical conductor and insulation material forming a gas and liquid tight barrier between the cable conductor and attached apparatus, and all interior chambers (7a, 7b, 7c) are contained in a common, liquid filled and pressure compensated outer chamber (4), the pressure compensation of the interior chambers (7a, 7b, 7c) is made against the pressure in the outer chamber (4).

2. Device according to claim 1, characterized in that the liquid can be exchanged continuously or discontinuously.

3. Device according to claim 1, characterized in that the pressure compensation against seawater is separate for each chamber or common for all of the interior chambers.

4. Device according to claim 1, characterized in that parts of the interior and/or outer chamber is partly filled with solid insulation material, in addition to liquid.

5. Device according to claim 1, characterized in that the insulation material (11), where the solid electrical conductor (10a, 10b, 10c) is led into attached apparatus, is shaped in a manner increasing the creeping current distance between the phase conductor and ground (the chamber).

6. Device according to claim 1, characterized in that water absorbing material, e.g. molecular sieve, is arranged in the outer chamber (4), and a such water absorbing material possibly also is arranged in the interior chambers (7a, 7b, 7c).

7. Device according to claim 1, characterized in that the liquid in the interior and outer chamber is a dielectric liquid.

8. Device according to claim 1 and 7, characterized in that at least two sealing devices (7a, 7b, 7c, 9a, 9b; 4, 6) are provided between a phase conductor (2a, 2b, 2c) and the surrounding water, said sealing devices (4, 8) being separated by means of a dielectrical material.

9. Device according to claim 1, characterized in that each phase conductor (2a, 2b, 2c) is filled with a sealing material in order to prevent said liquid from leaking into the phase conductor and to prevent possible water in the phase conductor from penetrating into the interior chamber (7a, 7b, 7c).

10. Device according to claim 9, characterized in that the electric field is controlled in the termination zone of the cable insulation by means of geometric or resistive-refractive methods.

11. Device according to claim 1, characterized in that the outer sheath (3) of the cable is terminated in the outer chamber (4).

12. Device according to claim 11, characterized in that a water tight barrier (6) is arranged between the cable (1) and the outer chamber (4), in order to prevent water from penetrating into and prevent liquid from penetrating out of the cable (1).

13. Device according to claim 12, characterized in that a liquid tight barrier is arranged between the outer chamber (4) and the cable (1), in order to prevent water in the cable (1) between the phase conductors (7a, 7b, 7c) from penetrating into the outer chamber (4), and the liquid in the outer chamber (4) from penetrating into the cable between the phase conductors.

* * * * *